United States Patent [19]
Jordan

[11] 3,742,679
[45] July 3, 1973

[54] STRETCHABLE PET SUIT WITH BOOTS

[76] Inventor: Constance Jordan, 110-20 7 1st Road, Forest Hills, N.Y. 11375

[22] Filed: Nov. 23, 1970

[21] Appl. No.: 92,070

[52] U.S. Cl. .................................. 54/79, 119/1
[51] Int. Cl. ..................... A01k 13/00, B68c 05/00
[58] Field of Search ................... 54/79, 82; 119/1

[56] References Cited
UNITED STATES PATENTS

| 2,222,705 | 11/1940 | Conlon | 54/79 |
| 2,443,831 | 6/1948 | Miller | 54/79 |
| 2,273,706 | 2/1942 | Hafner | 54/79 |
| 3,209,726 | | Fisher | 54/82 X |
| 2,003,435 | 6/1935 | Groff et al. | 54/79 |
| 2,064,566 | 12/1936 | Richman | 54/82 X |
| 3,150,641 | 9/1964 | Kesh | 54/79 X |

Primary Examiner—Hugh R. Chamblee
Attorney—Constance Jordan

[57] ABSTRACT

A pet suit is provided with elasticized strips along the back and along the breast and underneath sections and encircling the legs. On the legs are provided snap fasteners to which are attached elastic straps which are connected to boots to hold the latter on the legs. Laces encircle the boots to tie the same on the legs of an animal.

7 Claims, 3 Drawing Figures

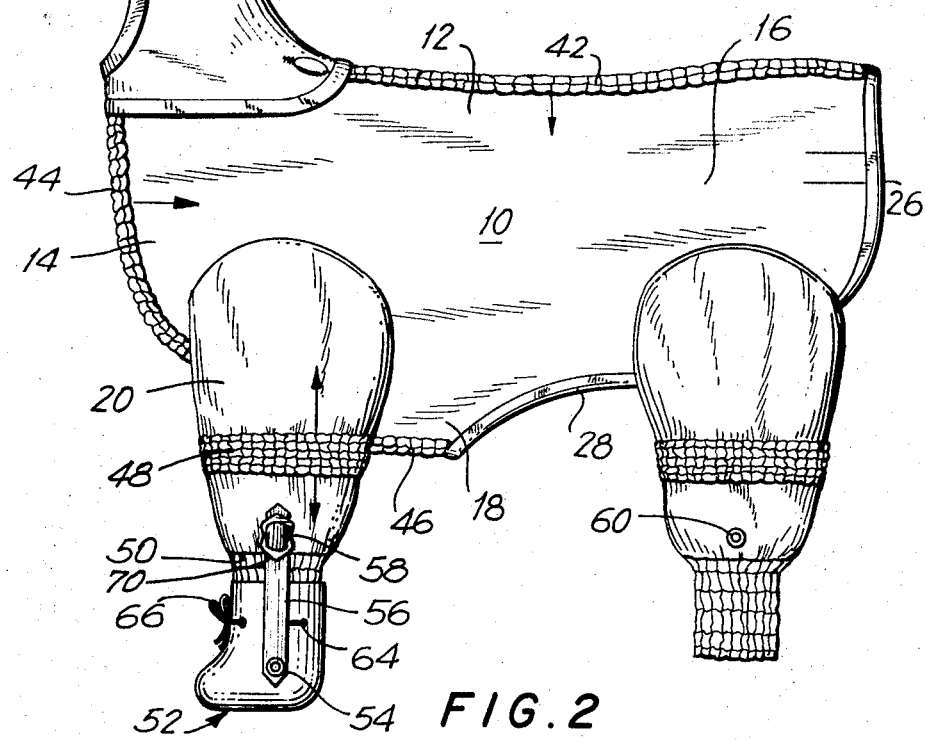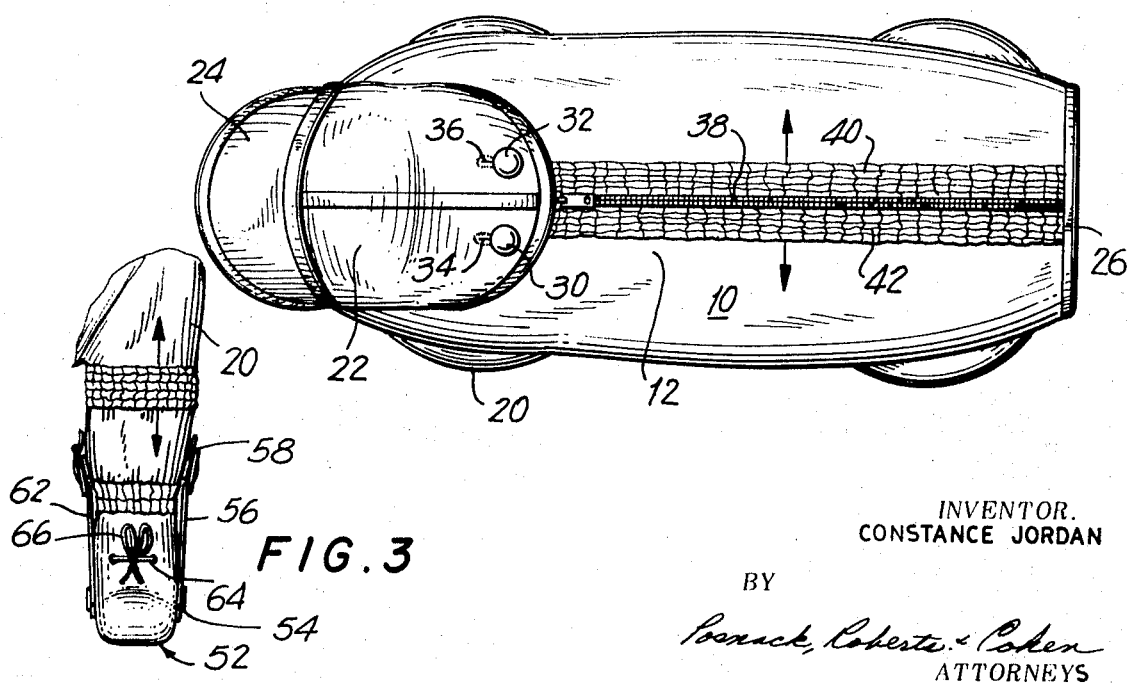

3,742,679

STRETCHABLE PET SUIT WITH BOOTS

BACKGROUND

1. Field of Invention:

This invention relates to suits for pets and more particularly to pet suits and associated boots.

2. Prior Art:

Pet suits of various forms and designs are known. Insofar as I am aware, however, none of these are provided with strips of elasticized material in the manner which will be set out in detail hereinafter for the purpose of adaptation to different sizes and shapes of animals.

It is also known to provide boots for pets. However, known boots do not readily accommodate movement of the animals to which they are applied and moreover do not have provision to prevent their coming off.

SUMMARY OF INVENTION

It is an object of the invention to provide an improved pet suit and particularly one which is provided with attachable boots.

It is another object of the invention to provide an improved pet suit which is adaptable to different sizes and shapes of animals.

Yet another object of the invention is to provide an improved pet suit which is easily manufactured and simple as regards application to a pet and which is of a design which would appeal to pet owners.

To achieve the above and other objects of the invention, there is proposed, in accordance with a preferred embodiment thereof, a pet suit comprising a body section having leg sections depending therefrom. In at least one of these sections elastic means are provided to permit an expansion of the same, the body and leg sections being otherwise of comparatively non-stretchable material.

In further accordance with the invention, boots are provided with elastic connection straps detachably connecting the boots to the leg sections. These boots may be further provided with an encircling array of holes and laces are employed which extends sinuously through the holes and which are adapted for being tied in a bow to secure the boots to the legs of an animal. Alternatively, the material of the boots can be pleated and the laces attached externally to the boots.

In accordance with a feature of the invention, fastening elements are provided on opposite ends of the aforesaid straps with cooperating fastening elements being provided on the boots and leg sections. A pair of straps is provided for each boot and preferably is designated to have an adjustable effective length.

The elastic means referred to hereinabove may consist of elasticized strips extending longitudinally along the back portion of the body section and/or longitudinally along the breast portion thereto down into the underneath portion. Furthermore, elasticized straps may be incorporated into the leg sections in encircling relatingship with the same.

The above and other objects and features of the invention will be better understood from the detailed description which follows hereinafter as illustrated in the accompanying drawing.

BRIEF DESCRIPTION OF DRAWING

FIG. 1 is a side view of a pet suit provided in accordance with a preferred embodiment of the invention with the hindmost boots removed;

FIG. 2 is a top view of the pet suit of FIG. 1; and

FIG. 3 is a front view of a single leg section with a boot attached.

DETAILED DESCRIPTION

The pet suit of the invention is generally indicated at 10. It comprises a back section 12, a breast section 14, lateral sections 16 and an underneath section 18. In addition, it has four depending leg sections 20 and may be provided with a hood 22 having a visor 24. The pet suit may be opened rearwardly as at 26 and downwardly as at 28.

The pet suit of the invention is preferably waterproof and is more particularly rainproof and snowproof. It can be made of a plastic such as vinyl or polyurethane, rubber, rubberized fabrics or other such materials which are water and snowproof, and which may be of comparatively non-stretchable character or materials such as wool may be employed. The hood may be detachably connected to the body section 10 due to the provision of buttons 30 and 32 and buttonholes 34 and 36. A single button and buttonhole or snap fastener may be substituted for the twin buttons and buttonholes and in the event of such substitution, the button or snap fastener will be centrally located.

To permit applying the pet suit to an animal, the suit is provided with a zipper 38 located in the back section 12 and extending longitudinally along the length of the suit. On either side of the zipper 38 is provided an elastic or expansible section 40 or 42, the purpose of which is to permit an expansion of the back section of the suit to provide for adaptation to animals of different sizes and shapes. The elastic or expansible section or strip may be of any known construction, but may particularly be, for example, of a crushed vinyl to which is attached elastic providing for expansion and contraction.

A similar elasticized strip is provided in the breast section as indicated at 44. This strip extends longitudinally along the breast portion and down into the underneath portion as indicated at 46.

In addition to the above mentioned elasticized strips, each leg section 20 may be provided with an elasticized strip as indicated at 48. Such strip is in encircling relationship to each of the leg sections and serves to connect the lower portion of the leg section to the upper portion thereof.

Further elasticized strips are provided in the form of elasticized cuffs 50 which are located in the bottommost extremities of the leg sections and provide for yieldably engaging the legs of the animal wearing the suit.

Since the portions of the various sections, other than the elasticized strips, may be of comparatively non-stretchable material, the espansibility of the suit providing for adaptation for different animal sizes and shapes is provided exclusively by the elasticized strips mentioned hereinabove. By limiting the elasticized areas to strips as indicated, provision is thereby made for facilitating the assembly of the garment, the seams of which are generally formed by the abutment of comparatively non-stretchable material. This greatly facilitates the provision of darts, pleats, and so forth. Moreover, it is believed that this contributes significantly to the watertightness of the garment since if the garment were to be made entirely of conventional stretchable material, there would likely result openings through which water or the like might enter the suit.

The pet suit of the invention is provided with four boots such as indicated generally at 52. These boots may e fabricated of rubber, leather, or vinyl or waterproofed fabric formed by molding or by any other suitable technique. Each boot has a strap on opposite sides thereof which is engaged by a cooperating fastening device indicated at 54 and mounted on an elastic strap 56, the opposite end of which is provided with a fastening element 58 which engages in a female fastening element 60 mounted on the corresponding leg section. The second corresponding strap is illustrated in FIG. 3 at 62. These two straps act in the manner of suspenders detachably connected to the leg section and similarly detachable from the boot at the lower cooperating fastening elements.

Each boot is provided with a circular array of holes 64 through which is engaged in sinuous manner a lace which is tied at the front of the boot in a bow 66. The lace is intended to cooperate in retaining the boot on the leg of the wearer in association with the straps 56.

The detachability of the boots facilitates application of the suit to an animal while the elasticized strips in the leg sections further facilitate placing the suit on an animal and accomodating movements of the animal while exercising or the like; the straps 56 being elastic, also accommodate different animal sizes. The straps 56 are moreover provided wtih an adjustment buckle 70 whereby the strap lengths are adjustable. This buckle bears the associated fastening element to provide for such adjustment.

Tests have shown that the use of the aforesaid straps in the manner of suspenders, taken separately or in conjunction with the laces 66, prevents accidental detaching and loss of the boots under all circumstances. Moreover, it has been found that the natural movements of the animal wearer are not interfered with to any important degree. The straps function both to hold the boot on the leg of the wearer and, in view of the provision of elasticized strips 48, to hold the leg sections of the suit pulled down to a suitable extent whereby riding up of the leg sections is avoided.

The elasticized strips at 44 and 48 accommodate the different shapes and sizes of the breast portions and legs of different types of animals whereas the elasticized strip 40–42 likewise accommodates different girths. The direction of stretch is shown in the drawing by arrows.

Many variations of the above-described construction are possible as defined by the following claims.

What is claimed is:

1. A pet suit comprising a body section, with detachable hood, leg sections depending from said body section, and elastic means in a limited zone of at least one of said sections to permit an expansion thereof; said pet suit comprising of boots and connection means for detachably connecting boots to the leg sections, wherein the connection means include elastic straps and fastening elements on opposite ends of the straps and cooperationg fastening elements on boots and leg sections, there being a pair of straps for each boot, extending between the fastening element on the boot and fastening elements on the leg sections, said straps having an adjustable effective length.

2. A suit as claimed in claim 1, wherein said body section includes relatively non-stretchable back, breast, lateral and underneath portions and said elastic means is located in at least one of said portions.

3. A suit as claimed in claim 2, wherein the elastic means includes an elasticized strip extending longitudinally along said back portion, comprising a zipper extending through the strip in parallel thereto.

4. A suit as claimed in claim 3, wherein the elastic means includes an elasticized strip extending longitudinally along said breast portion and into said underneath portion.

5. A suit as claimed in claim 4, wherein the elastic means includes elasticized strips encircling each of the leg sections.

6. A suit as claimed in claim 5 comprising elasticized cuffs on the leg sections.

7. A suit as claimed in claim 6, wherein said boots are each provided with an encircling array of holes, comprising laces extending sinuously through the holes and adapted for being ties in a bow to secure the boots to the legs of an animal.

* * * * *